March 21, 1944.  D. MAPES  2,344,513
CYLINDER BRACKET
Filed April 25, 1942
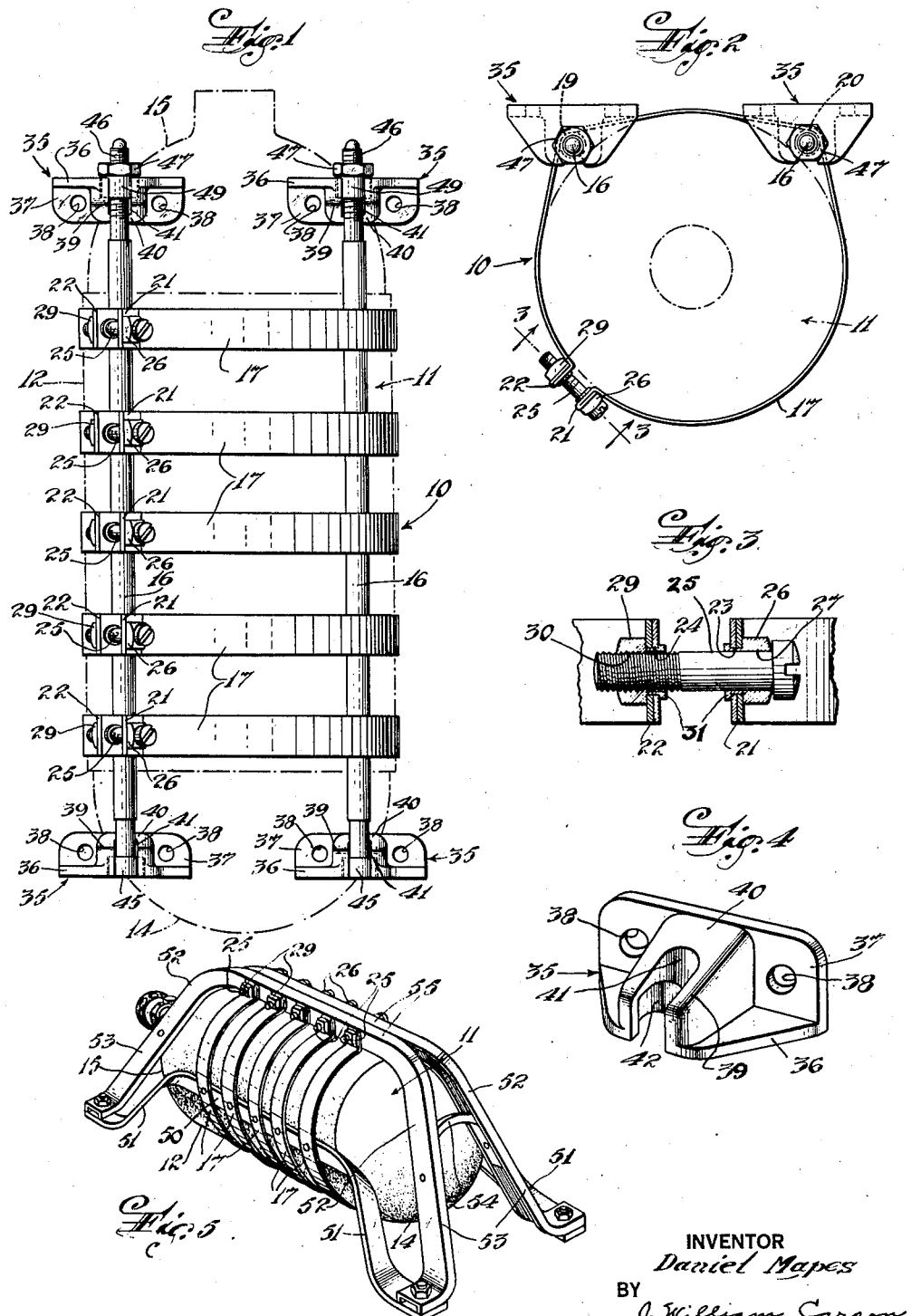
INVENTOR
Daniel Mapes
BY
J. William Carson
ATTORNEY Patented Mar. 21, 1944

2,344,513

UNITED STATES PATENT OFFICE 2,344,513

CYLINDER BRACKET

Daniel Mapes, West Caldwell, N. J., assignor to Specialties Development Corporation, Bloomfield, N. J., a corporation of New Jersey Application April 25, 1942, Serial No. 440,485

8 Claims. (Cl. 248—313)

The present invention relates to supports, and more particularly to brackets for cylinders containing a fluid medium under high pressure.

Airplanes, armored tanks and other vehicles or craft utilized in warfare usually carry a supply of a medium under high pressure adapted to be used for various purposes. For example, in connection with aircraft, a supply of oxygen may be provided for use during high altitude flights, and/or a supply of liquid carbon dioxide may be provided for extinguishing or preventing fires, or for effecting emergency operation of various mechanisms. Armored tanks and other vehicles or craft likewise may also be provided with a supply of carbon dioxide or some other pressure medium. The use of high pressure media in the foregoing manner has become quite extensive and it is not unusual to provide a vehicle or craft with several sources of supply of one or more kinds of pressure medium.

Generally, the fluid pressure medium is confined in metal containers which usually are substantially cylindrical in shape and are known as cylinders. These cylinders are constructed to withstand the high pressure of the confined pressure medium. Heretofore, various types of brackets have been used for attaching the cylinders to a structural member of the craft or vehicle in which they were utilized, but these brackets were found to be unsuitable when the cylinders were subjected to machine gunfire, shrapnel, or similar conditions which may be encountered during combat.

It has been found that, when a projectile pierces a cylinder containing a high pressure medium, the cylinder recoils, due to the sudden release of the pressure medium confined therein, and is torn from its support. As a result, the cylinder may rocket about in the craft or vehicle causing damage thereto or injury to its occupants. By reason of the fact that the cylinders are constructed to withstand relatively high internal pressures, they are generally made of metal, and thus can cause substantial injury and damage. In some instances, the cylinders may explode with bomb-like violence and shatter, whereby fragments thereof will scatter within the craft or vehicle to create a hazard comparable to flying shrapnel.

The present invention aims to provide improved brackets for cylinders, used in connection with airplanes, armored tanks and other vehicles or craft, which overcome the foregoing difficulties and disadvantages.

An object of the present invention is to provide cylinder brackets adapted to prevent the cylinders from being torn from their supports when struck by gunfire or the like.

Another object is to provide cylinder brackets adapted to prevent the cylinders from being torn apart when struck by gunfire or the like.

Another object is to provide cylinder brackets adapted to prevent fragments of the cylinders from scattering within a craft or vehicle.

Another object is to provide cylinder brackets of the foregoing character which are simple in design and may be economically manufactured.

Another object is to provide cylinder brackets which are relatively light in weight yet rugged in construction.

Another object is to provide cylinder brackets which enable the cylinders to be rapidly assembled therein to form a unit adapted to be mounted on or removed from a supporting structural member in a convenient manner.

A further object consists in the combination and arrangement of the parts of the brackets, whereby the foregoing objects and advantages may be accomplished.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

Figure 1 is an elevational view of a cylinder bracket, illustrating an embodiment of the invention.

Figure 2 is a top view of the cylinder bracket shown in Figure 1.

Figure 3 is an enlarged fragmentary sectional view taken along the line 3—3 on Figure 2.

Figure 4 is a perspective view of a clip for securing the cylinder bracket to a supporting structural member.

Figure 5 is a perspective view of a slightly different cylinder bracket, illustrating another embodiment of the invention.

In accordance with the invention, the foregoing objects may be accomplished by a bracket comprising a series of relatively closely spaced apart members adapted to closely embrace a cylinder or a substantially cylindrical container and provide a cage-like structure adapted to prevent the cylinder or container from being torn apart when pierced by gunfire or the like. The spacing of the members is such that approximately one-half of the cylindrical surface of the container is protected thereby. The bracket members, referred to above, may be metal bands or straps, and preferably are mounted on a pair of members extending lengthwise with respect to the cylinder, thereby to provide a ribbed structure. The respective ends of the straps may be fastened together to hold the cylinder in clamping relation. The bracket may be provided with suitable means for engaging the end walls of the cylinder to prevent lengthwise movement thereof with respect to the bracket.

Referring to the drawing, and more particularly to Figures 1 and 2, there is shown a bracket 10 for a cylinder 11 adapted to contain a fluid medium under relatively high pressure. The cylder is illustrated more or less diagrammatically, in broken lines, and has a cylindrical body or side wall 12, a closed end provided by a hemispherical end wall 14, an a neck or outlet and a shoulder at the other end provided by a curved end wall formation 15. It will be understood that the outlet of the cylinder may be provided with a suitable valve or release device or piping for conducting the fluid medium to its point of use.

The bracket 10 comprises a pair of upright, spaced apart, substantially parallel rods or like members 16 adapted to extend lengthwise with respect to the cylinder, and a series of transverse straps or bands 17 secured to the rods 16 in relatively closely spaced relation along the length of the rods. The straps 17 are substantially parallel to each other and are each secured to the rods 16 at points 19 and 20 (Figure 2), intermediate their ends and the ends of the rod, by brazing, soldering or welding. The straps are of a suitable width to provide a sturdy cage-like structure, and preferably are formed of a somewhat flexible or bendable metal having relatively high tensile strength.

The straps 17 are adapted to be folded or placed about the side wall 12 of the cylinder to substantially encircle the side wall 12 in closely embracing relation. If desired, the straps may be preformed to fit about the side wall of the cylinder. The respective free ends of each of the straps may be fastened by suitable means, about to be described, whereby the straps may hold the cylinder in clamping relation.

As shown in Figures 2 and 3, the fastening means for each of the straps preferably comprises an offset portion or ear 21 at one end of the strap, extending approximately at right angles to the strap in a substantially radially outward direction; and a similar offset portion or ear 22 at the other end of the strap. The offset portions 21 and 22 are formed by doubling back the end portions of the strap, and are provided with an aperture 23 and 24, respectively, for receiving a bolt or screw 25, or the like, adapted to draw the ends of the straps together.

As illustrated herein, the offset portions 21 may be provided with a reenforcing member such as a bushing or nut-shaped member 26 which has an aperture 27 in alignment with the aperture 23 for slidably receiving the shank of the bolt 25. The other offset portions 22 may be provided with a nut member 29, acting as a reenforcing member, which has a threaded aperture 30 in alignment with the aperture 24 for receiving the threaded portion of the shank of the bolt 25.

The members 26 and 29 may be secured to the straps in any suitable manner, for example, by welding, soldering, brazing or the like. In the illustrative embodiment, they are shown provided with sleeve portions 31 extending through the apertures of the offset portions and flanged outwardly to secure the nut members and prevent the doubled-back portions of the straps from unfolding (Figure 3). By attaching the members 26 and 29 to the straps, they cannot be lost, and are in a position at all times to receive the bolts 25, whereby the ends of the straps may be fastened more rapidly and conveniently.

The bracket may be mounted on a structural member in any suitable manner. This may be accomplished by positioning a suitable clip, dog or angle-piece 35 on each end of each rod 16, a total of four clips being utilized. These clips, as shown in Figure 4, comprise a horizontal flange 36, and an upright flange 37 having apertures 38 therein adapted to receive bolts or screws for securing the clips to a supporting structural member such as a wall, floor or girder of a craft or vehicle. A lug or projection 39, having a face 40 is formed between the flanges 36 and 37 and has a slot 41 therein, provided with a reentrant counterbored recess portion 42 forming a shoulder for the purpose about to be described.

In order to attach the clips 35 to the rods 16, the rods have a head or enlarged portion 45 at one end, for example, at the lower end, adapted to be received by the counterbored portion 42 of a clip having its projection 39 facing upwardly; and have a threaded portion 46 at the other end for receiving a nut 47 or the like having a tubular sleeve, collar or bushing portion 49 adapted to fit into the counterbored portion 42 of a clip 35 having its projection 39 facing downwardly. By threading the nuts 47 on the rods, the heads 45 are pulled up against the shoulder of the counterbored portions 42 of the lower clips to hold the rods 16 securely in mounted position.

In practice the clips may be secured to the supporting member in a predetermined spaced position to receive the rods 16 of the bracket. The bracket structure, including the rods and the straps 17, may be assembled as a unit with the cylinder and then attached to the clips to simultaneously mount the unit. When it is desired to recharge or check the weight of the contents of the cylinder, the bracket and cylinder may be removed as a unit by unscrewing the nuts 47 sufficiently to permit the nuts 47 and the heads 45 on the rods 16 to be withdrawn from the counterbored portions 42 of the slots 41.

In Figure 5 a slightly different form of bracket is shown, illustrating another embodiment of the invention. The straps 17 are secured to a pair of lengthwise extending bars 50, which take the place of the rods 16. These bars have end portions 51 curved away from the cylinders for mounting the bracket on a supporting structural member.

An auxiliary frame structure is provided, which comprises a pair of cradle members 52 having legs 53 at their ends, each adapted to be secured to an end portion 51 of the bars 50; and a member 54 connecting a pair of legs 53 at each end of the cylinder. The legs 53 and/or members 54 may be constructed to abut the end walls of the cylinder to prevent lengthwise movement thereof with respect to the bracket. Intermediate the legs 53, the cradle members are provided with a lengthwise extending portion 55 disposed between the ends of the straps and having apertures therein for receiving the bolts 25 of the fastening means, whereby the fastening means serve to clamp the straps around the cylinder and to secure the straps to the cradle member to provide a cylinder and bracket unit. The unit may be secured to a supporting structure by suitable means in any suitable manner.

From the foregoing description it will be seen that the present invention provides an improved bracket adapted for cylinders which may be subjected to gunfire. By providing a series of individual substantially hoop-like band or strap members, damage to some of these members will not affect the others which will still serve to effectively retain the container. The brackets prevent the cylinders from being torn therefrom due to recoil and thus serve to maintain the cylinders in their secured position when struck by gunfire or the like. The cage-like or ribbed structure prevents the fragments of a pierced cylinder from scattering. To some extent, the straps provide a cylinder protecting and reenforcing frame, and minimize the chances of the cylinder being struck directly and bursting with explosive violence. The brackets are readily manufactured and assembled and may be attached to the cylinders and handled therewith as a unit. The brackets are rugged in construction and can withstand the rough usage to which they may be subjected.

While the present invention has been described in connection with cylindrical containers, for illustrative purposes, it will be understood that the principles thereof may also be applied to brackets for containers which are substantially spherical in shape.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. A bracket for a substantially cylindrical container adapted to contain a fluid medium under high pressure, comprising supporting means adapted to extend substantially lengthwise with respect to the container, a plurality of straps closely encircling the container and secured to said supporting means, the spacing of said straps being such that approximately one-half of the cylindrical surface of the container is protected thereby, and means for fastening the straps about the container, whereby said straps are adapted to hold the container in clamping relation to prevent the container from being torn apart when struck by gun fire or the like.

2. A bracket for a substantially cylindrical container adapted to contain a fluid medium under high pressure, comprising a pair of spaced apart substantially parallel rods adapted to extend substantially lengthwise with respect to the container, a plurality of straps closely encircling the container and secured to said rods, the spacing of said straps being such that approximately one-half of the cylindrical surface of the container is protected thereby, and means for fastening the straps about the container, whereby said straps are adapted to hold the container in clamping relation to prevent the container from being torn apart when struck by gun fire or the like.

3. A bracket for a substantially cylindrical container adapted to contain a fluid medium under high pressure, comprising supporting means adapted to extend substantially lengthwise with respect to the container, a plurality of straps closely encircling the container and secured to said supporting means, the spacing of said straps being such that approximately one-half of the cylindrical surface of the container is protected thereby, means for fastening the straps about the container, whereby said straps are adapted to hold the container in clamping relation to prevent the container from being torn apart when struck by gun fire or the like, and means on said supporting means for mounting the bracket on a supporting structural member.

4. A bracket for a substantially cylindrical container adapted to contain a fluid medium under high pressure, comprising a pair of spaced apart substantially parallel rods adapted to extend substantially lengthwise with respect to the container, a plurality of straps closely encircling the container and secured to said rods, the spacing of said straps being such that approximately one-half of the cylindrical surface of the container is protected thereby, means for fastening the straps about the container, whereby said straps are adapted to hold the container in clamping relation to prevent the container from being torn apart when struck by gun fire or the like, and means attached to said rods adjacent each end thereof for mounting the bracket on a supporting structural member.

5. A bracket for a substantially cylindrical container adapted to contain a fluid medium under high pressure, comprising supporting means adapted to extend substantially lengthwise with respect to the container, a plurality of straps closely encircling the container and secured to said supporting means, the spacing of said straps being such that approximately one-half of the cylindrical surface of the container is protected thereby, an auxiliary substantially lengthwise extending frame structure secured to said supporting means, said frame structure having portions for engaging the end walls of the container, and means for fastening the straps about the container and to said frame structure, whereby said straps are adapted to hold the container in clamping relation to prevent the container from being torn apart when struck by gun fire or the like.

6. A bracket for a substantially cylindrical container adapted to contain a fluid medium under high pressure, comprising a pair of spaced apart substantially parallel members adapted to extend substantially lengthwise with respect to the container, a plurality of straps closely encircling the container and secured to said members, the spacing of said straps being such that approximately one-half of the cylindrical surface of the container is protected thereby, an auxiliary frame structure secured to the ends of said pair of members having a portion extending lengthwise with respect to the container and having a cradle portion at each end for engaging the end walls of the container, and means for fastening the straps about the container and to the lengthwise extending portion of said frame structure, whereby said straps are adapted to hold the container in clamping relation to prevent the container from being torn apart when struck by gun fire or the like.

7. A bracket for cylinders, comprising a pair of spaced apart parallel rods adapted to extend lengthwise with respect to a cylinder, each of said rods having a head at one end and a threaded portion adjacent the other end; a series of transverse parallel straps secured to said rods in relatively closely spaced relation and being adapted to encircle the side wall of the cylinder; means for fastening the respective ends of each of said straps, whereby said straps are adapted to hold the cylinder in clamping relation; a clip member mounted on each rod at each end thereof adapted to be secured to a structural member; and a nut member adapted to be threaded on the threaded end portion of each rod to engage a clip member and cause said head on the other end of said rod to engage a clip member, whereby said clip members are adapted to secure said rods to the structural member.

8. A bracket for cylinders, comprising a pair of spaced apart parallel rods adapted to extend lengthwise with respect to a cylinder, each of said rods having a head at one end and a threaded portion adjacent the other end; a series of transverse parallel straps secured to said rods in relatively closely spaced relation and being adapted to encircle the side wall of the cylinder; means for fastening the respective ends of each of said straps, whereby said straps are adapted to hold the cylinder in clamping relation, said means including an offset portion at one end of each of said straps provided with an aperture and a reenforcing member having an aperture therein, an offset portion at the other end of each of said straps provided with an aperture and a nut member secured thereto, and a bolt member adapted to extend through said apertures and be threaded into said nut member; a clip member mounted on each rod at each end thereof adapted to be secured to a structural member; and a nut member adapted to be threaded on the threaded end portion of each rod to engage a clip member and cause said head on the other end of said rod to engage a clip member, whereby said clip members are adapted to secure said rods to the structural member.

DANIEL MAPES.